United States Patent [19]
Woods

[11] Patent Number: 4,650,257
[45] Date of Patent: Mar. 17, 1987

[54] HEAVY EQUIPMENT TIRE RIM

[76] Inventor: Luther L. Woods, 2005 Washington Ave., Ishpeming, Mich. 49849

[21] Appl. No.: 665,736

[22] Filed: Oct. 29, 1984

[51] Int. Cl.$^4$ .................... B60B 21/04; B60B 21/10
[52] U.S. Cl. .................................... 301/97; 301/63 R; 152/378 R; 152/381.3; 29/159.1; 228/182
[58] Field of Search ............ 228/182; 29/159 R, 159.1; 301/63 R, 97; 474/166; 152/378 R, 378 W, 379.3, 381.3, 393, 394

[56] References Cited

U.S. PATENT DOCUMENTS

| | | | |
|---|---|---|---|
| 577,308 | 2/1897 | Moore | 301/98 |
| 622,176 | 3/1899 | Beacock | 301/98 |
| 1,788,431 | 1/1931 | Goodyear et al. | 301/98 |
| 2,028,536 | 1/1936 | Eksergian | 301/97 |
| 2,051,498 | 8/1936 | Short | 74/439 |
| 2,057,628 | 10/1936 | Gaenssle | 301/97 |
| 2,181,848 | 11/1939 | Le Jeune et al. | 29/159.1 |
| 2,185,347 | 1/1940 | Le Jeune | 29/159.1 |
| 2,221,415 | 11/1940 | Short | 228/182 X |
| 2,236,054 | 5/1940 | Di Curzio | 301/63 |
| 2,352,501 | 6/1944 | Slavicek | 228/182 X |
| 2,355,941 | 8/1944 | Ash | 301/63 |
| 3,438,111 | 4/1969 | Wilcox | 29/159.1 |
| 3,674,080 | 7/1972 | Verdier | 152/378 R X |
| 3,758,161 | 9/1973 | Bradley et al. | 301/63 R |
| 3,762,012 | 10/1973 | Aker | 29/159 R |
| 3,926,025 | 12/1975 | Schroder | 72/84 |
| 4,029,139 | 6/1977 | Abbott | 152/379.1 |
| 4,054,322 | 10/1977 | Grawey | 301/35 BJ |
| 4,088,372 | 5/1978 | Jewett et al. | 301/63 |
| 4,123,112 | 10/1978 | Mills | 301/35 BJ |
| 4,235,275 | 11/1980 | Sons, Jr. | 152/410 |
| 4,286,825 | 9/1981 | Sieving | 301/63 R |
| 4,351,382 | 9/1982 | Corner et al. | 152/330 |

FOREIGN PATENT DOCUMENTS 412293 6/1934 United Kingdom ................ 152/378

OTHER PUBLICATIONS

Firestone Brochure—Author: Firestone Electric Wheel Company date not known.
Electric Wheel Company Drawing 56.5×20 . . . Rim Assembly—date not known.

Primary Examiner—David A. Scherbel
Attorney, Agent, or Firm—Wheeler Law Firm

[57] ABSTRACT

A heavy equipment tire rim is constructed from stock shapes of metal. The base is a right cylinder. Flat radial annular disks are welded to the cylindrical base and support a steel cone having a cone angle of 15 degrees from the surface of the cylinder to support the tire bead. There are two disks for each cone to support the cone at its smallest diameter and at its largest diameter. Additional intermediate disks may be used. In another version bar stock lengths span the diagonal between the base of the outermost annular disk where it meets the cylindrical base and the periphery of the smaller radial disk where it meets the smallest circumference of the cone. The bars are in closely spaced annular series. The tire bead stop is welded to the outer circumference of the cone or to a cylindrical skirt extending the outer circumference of the cone. The stop is made of round, semi-round, or quarter-round stock. The tire bead is retained by an arc which is a quarter of a circle. All of the parts are in compression rather than tension.

9 Claims, 6 Drawing Figures

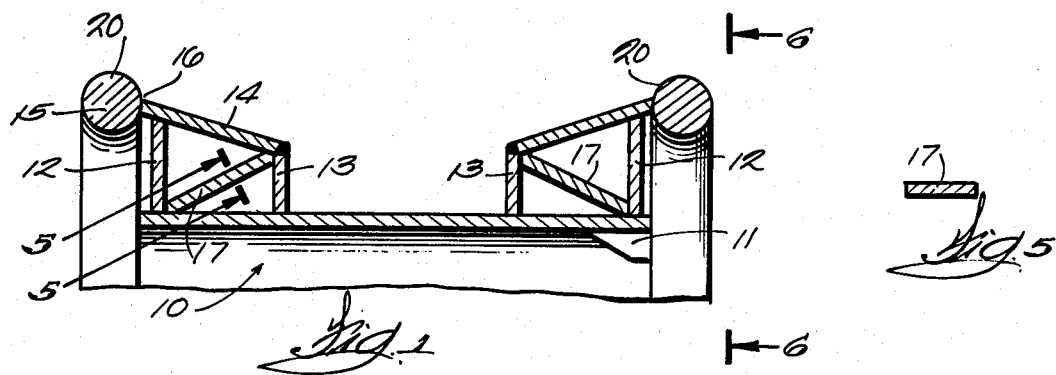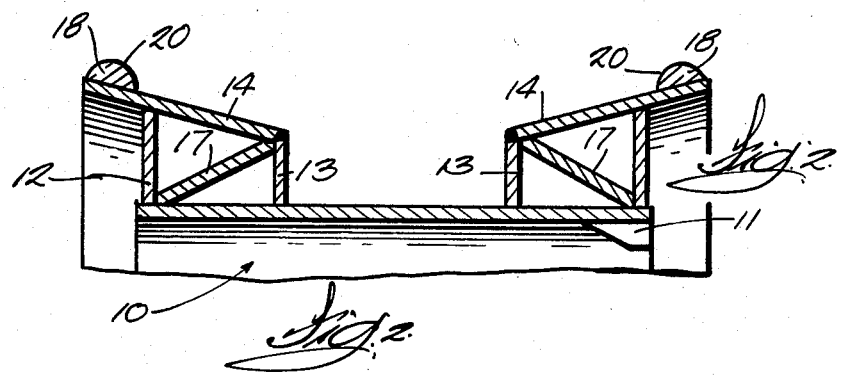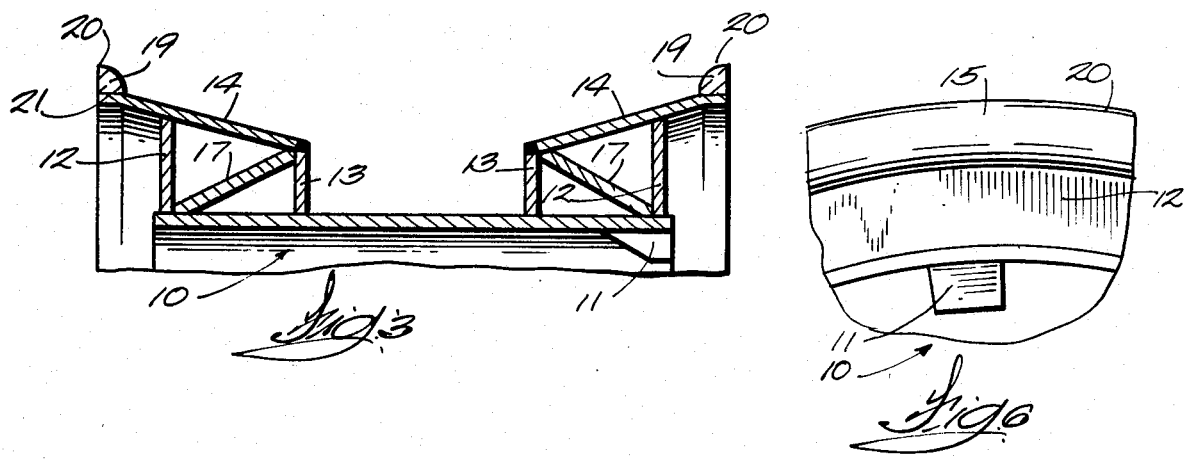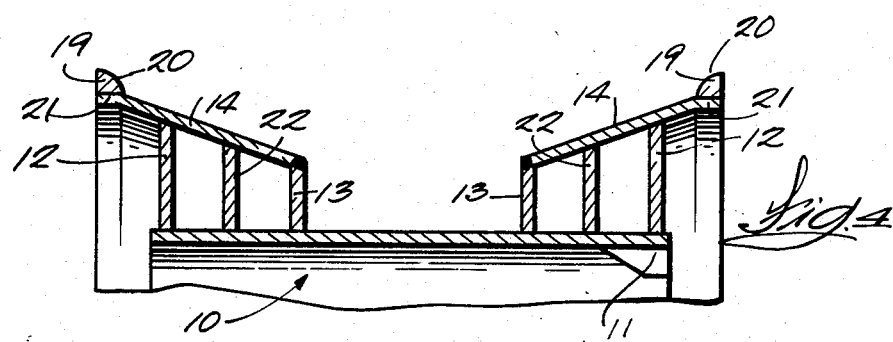

HEAVY EQUIPMENT TIRE RIM

BACKGROUND OF THE INVENTION

This invention is an improvement on such wheel rims as the Firestone Electric Wheel Company "1 piece" rim. A generally similar disclosure is found in U.S. Pat. No. 4,286,825. Other known constructions include U.S. Pat. Nos. 4,054,322; 4,088,372; 2,236,054; 4,123,112; 3,762,012; 2,355,941; 2,051,498; 4,235,275; 4,351,382; 4,029,139; 3,926,025; 3,7,58,161; 3,438,111; 2,185,347; 2,181,848; 1,788,431; 622,176; and 577,308.

In all of these patents only one, Ash U.S. Pat. No. 2,355,941 shows a cylindrical member of any kind and that is not the base for a tire rim but is the outer surface of a bogie wheel for a battle tank. Short U.S. Pat. No. 2,051,498 shows a somewhat similar member which serves a part of a reduction gear. Mills U.S. Pat. No. 4,123,112 shows a structure which appears similar at first glance in the printed figure on the first page but the remaining figures show quite clearly that the surfaces are not parts of cylinders but are much more complex since only portions of the surfaces are shown on the first page. Likewise, Graway U.S. Pat. No. 4,054,322 has a figure on the first page which appears at first glance to be similar (FIG. 20) but when the other figures are considered it apparent that the structure shown is not cylindrical but includes conical portions and is part of the tire supporting structure rather than a base. Sieving U.S. Pat. NO. 4,286,825 shows a cylindrical reinforcement which is made a part of a pressed steel wheel rim.

SUMMARY OF THE INVENTION

My rim includes a base which is a plain right cylinder to which plane annular disks are secured to support opposed conical tire bead support surfaces, the angle of the cone being the angle of the inner surface of the tire intended to be mounted, tire bead retaining members made out of solid rod stock secured to the larger circumference of each cone to present a circular surface at least 90 degrees in extent toward the tire, and if desired a ring of bar stock reinforcing members each extending from the base of the outer disk to the outer periphery of the inner disk supporting the cone, successive bars being placed in an annular series. Applicant's invention thereby provides a wheel rim made almost entirely of stock shapes. However analysis shows that unlike prior art designs the welded joints in applicant's structure are all placed in compression by stresses rather than tension thereby greatly strengthening the entire structure. It is shown by mathematical analysis that the increase in strength in on the order of 60%. Testing shows similar results. Thus simplified construction leads to a great increase in strength.

DRAWINGS

FIG. 1 is a cross sectional view in the axial plane showing the upper half of 1 embodiment of the wheel rim of my invention.

FIG. 2 is a view like that of FIG. 1 through a second embodiment of the wheel rim of my invention.

FIG. 3 is a view like that of FIG. 1 of a third embodiment of my invention.

FIG. 4 is a view like that of FIG. 1 through a fourth embodiment of my invention.

FIG. 5 is a cross sectional view on line 5—5 of FIG. 1.

FIG. 6 is a fragmentary end view taken at Line 6—6 of FIG. 1.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As shown in FIG. 1 and each of the other figures each of the wheel rims of my invention have as their basic structure, a plain cylindrical wheel rim base 10 provided with welded attachment points 11 to secure the wheel rim to the wheel of the equipment. Cylindrical hub 10 has a number of radial disks 12, 13 welded to its surface to support conical member 14, which has a surface angled 15 degrees from the surface of cylinder 10 to support the bead of a heavy equipment tire. At the outer margin of cone 14 is a tire bead retaining member 15 which in FIG. 1 is a cylindrical rod formed to a circle of a diameter which permits it to be welded at its mid point 16 to cone 14 to retain a tire bead in place. Finally, a series of bars 17 are welded diagonally across the space between disk 12 and disk 13 so that each bar 17 butts against disk 12 and cylinder 10 at one end and against the outer margin of disk 13 where it butts cone 14 at the other end. Bars 17 are placed in this way at short intervals around the entire circumference of cylinder 10 rather than forming a cone shaped member to fit in that location, greatly simplifying assembly. Bars 17 may be cut of standard bar stock. Disks 12 and 13 are flat stock. Bead retainer 15 is standard rod stock and base 10 is standard cylindrical stock. Thus nearly all of the parts of the tire rim are made of standard stock sizes cut to length or cut to shape and welded in place. This forms an extremely simple and extremely strong wheel rim structure in which the parts are all in compression rather than in tension. Testing has shown that the structure of this invention is extremely strong compared to standard construction.

As shown in FIGS. 2 and 3 the structure shown in FIG. 1 may be modified to include tire bead retaining members which are half round as shown at 18 in FIG. 2 or quarter round as shown 19 in FIG. 3. Both half round bars and quarter round bars are standard shapes and retain the rim as well as fully round retaining member 15 in FIG. 1 since in each case the height of the retainer form cone 14 to outermost point 20 is the same for a bar having the same radius. The stiffening effect of the bars of course differs and it may be chosen for the intended application. FIGS. 2 and 3 differ in one further respect. In FIG. 3 the cone 14 is provided with a cylindrical extension 21 extending beneath quarter round tire bead retention number 19 instead of continuing at the same 15 degree angle as cone 14 proper. This is a variation which may be desirable in some cases. The cylindrical skirt 21 may also be used to under lie a half circular tire bead retaining member 18 if desired. A final variation is shown FIG. 4. In that figure bars 17 are omitted and instead an additional radial reinforcing disk 22 is shown. The variations shown in the several figures may be combined in additional ways as will be apparent from a study of the drawings. In all of the variations an extremely strong tire wheel rim is formed which is exceedingly unlikely to leak air despite the high tire pressures found in heavy equipment so that the economies in manufacture eead to a stronger structure rather than a weaker one.

I claim:

1. A heavy equipment tire rim comprising a unitary cylindrical base having two ends substantially underlying the beads of a tire to be placed on said rim, means to attach said base to a heavy equipment wheel, a pair of opposed tire bead support cones concentric around the two ends of said base cylinder, flat annular disks supporting said cones directly radially from said ends of said base cylinder with the largest end of each cone located generally outward from an end of the base cylinder, and a tire bead retaining member fabricated separately from a straight piece of stock extending around the largest diameter of said rim and having a circumferential tire bead engaging surface which is at least one quarter of the arc of a circle extending outwardly from said cone and welded thereto.

2. In a heavy equipment tire rim a pair of opposed tire bead support cones arranged coaxially with their large ends farthest from one another, the surfaces of the cones having an angle with respect to the axes of the cones at an angle the same as the angle to said axis of a tire bead to be supported on the cone, a tire bead retaining member secured entirely around the outer margin of said rim said tire bead retaining member having a surface which is at least one quarter of a circle facing axially inwardly from the outer end of said rim to face a tire bead placed on said cone, a cylindrical base coaxial with said cones and spaced radially inwardly form said cones and having means to attach said base to the heavy equipment wheel, and a plurality of annular disks of different sizes extending radially between said base and each said cone, a smallest of said disks being secured to the smallest diameter of each said cone and a largest said disc being secured.

3. The device of claim 1 or claim 2 in which each cone is supported by the two said disks.

4. The device of claim 1 or claim 2 in which each cone is supported by at least 3 said disks including at least 1 said disk extending from said base to said cone between the disk at the smallest diameter of the cone and the disk at the largest diameter of the cone.

5. The device of claim 1 or 2 in which an annular series of straight bars is secured in the space between said cone and said base with each said bar extending from the smallest diameter of the cone substantially to the end of said cylinder.

6. The device of claim 5 in which each said bar is rectangular in cross section.

7. The device of claim 1 or 2 in which each tire bead retaining member has an axial cross sectional form which is a full circle.

8. The device of claim 1 or 2 in which each tire bead retaining member has an axial cross sectional form which is one half circle.

9. The device of claim 1 or 2 in which each tire bead retaining member has an axial cross sectional form which is one fourth circle.

* * * * *

UNITED STATES PATENT AND TRADEMARK OFFICE
CERTIFICATE OF CORRECTION

PATENT NO. : 4,650,257
DATED : 17 March 1987
INVENTOR(S) : LUTHER L. WOODS

It is certified that error appears in the above—identified patent and that said Letters Patent is hereby corrected as shown below:

Column 3 Line 1 delete [eead] insert --lead--

Column 3 Line 30 delete [form] insert --from--

Column 4 Line 6 insert after "secured" and before "."
   --to an end of said cylindrical base underlying said cone--

Signed and Sealed this

Twenty-fourth Day of May, 1988

Attest:

DONALD J. QUIGG

Attesting Officer      Commissioner of Patents and Trademarks